UNITED STATES PATENT OFFICE 2,582,872

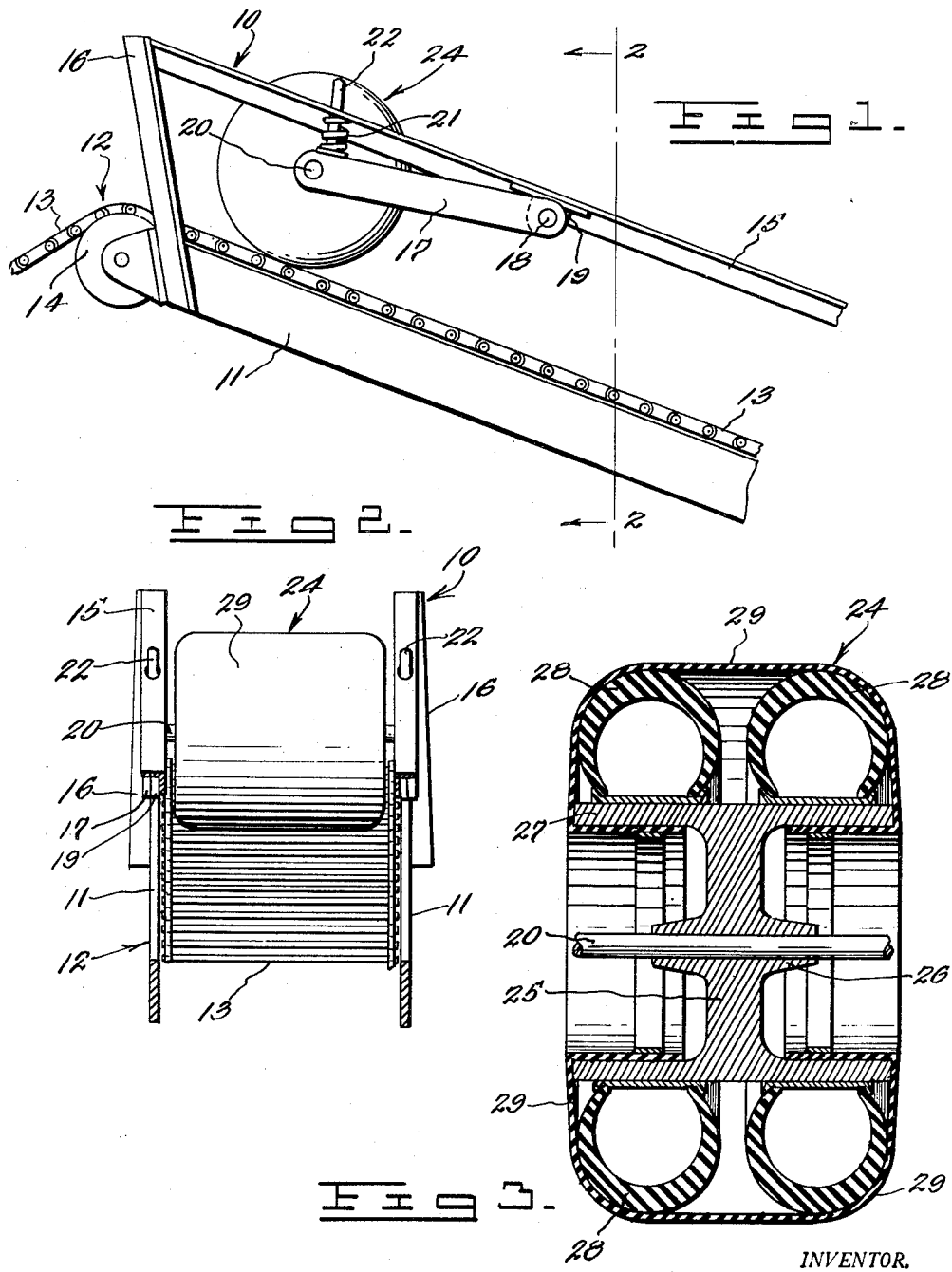

CLOD CRUSHING ROLLER

Charles H. Krengel, Twin Falls, Idaho

Application November 6, 1947, Serial No. 784,373

1 Claim. (Cl. 241—293)

This invention relates generally to improvements in farm machinery and is directed particularly to an improved attachment for machines for harvesting potatoes.

In the operation of potato harvesting machines particularly in those sections of the country where the earth is of heavy character and tends to form large clods, considerable difficulty is encountered in breaking and removing the earth clods in that portion of the machine where the potatoes are separated from the vines and fed off to a separate conveyor to be deposited at a sacking station. As is well known to those versed in the art the potatoes and vines are carried on screen conveyors having large meshes through which the earth is shaken for the purpose of cleaning the potatoes. However, in those sections where the earth is of a tenacious character, the clods do not break down easily and it frequently happens that the clods are sacked with the potatoes.

A particular object of the present invention is to provide in a potato harvesting machine, a means for breaking up the earth clods on the conveyor screen or chains whereby the earth can be effectively shaken away from the potatoes and the potatoes delivered in a thoroughly clean condition to the sacking station.

Another and more specific object of the invention is to provide in a potato harvesting machine having an inclined conveyor structure along which the potatoes and vines are carried to a predetermined position and during which carrying period the earth is shaken free, a clod breaker overlying and coacting with the conveyor and designed to impose a firm downward pressure upon the clods, potatoes and vines whereby to break up the clods into relatively small particles.

Still another object of the invention is to provide in an apparatus of the character described, a clod breaking means consisting of a relatively large, soft tired wheel supported to rest upon the top run of the conveyor and adapted to have up and down movement, whereby the potatoes and earth clods in passing under the wheel will be separated one from the other and the clods will be broken down into sufficiently small particles to pass through the conveyor screen so that the potatoes may be delivered therefrom in relatively clean condition.

Other objects and advantages of the invention will become apparent as the description of the same proceeds and the invention will be best understood from a consideration of the following description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in side elevation of the upper end of a portion of an elevator structure forming a part of a potato harvester, showing the invention applied.

Figure 2 is a sectional view taken substantially on the line 2—2 of Figure 1.

Figure 3 is an axial section through the clod crushing wheel.

Referring now more particularly to the drawings the numeral 10 generally designates a portion of an endless chain elevator or conveyor by means of which the potatoes and vines are raised, after the potatoes are lifted from the ground by the machine plows, not shown, to an elevation where the potatoes are carried off in one direction and the vines are discharged in another direction. During this period of travel of the potatoes and vines, a considerable quantity of earth is carried along with the potatoes but is expected to be completely eliminated from the potatoes by the time the latter leave the conveyor to be carried to the conveyor to be carried to the sacking station. However, as previously stated, certain types of earth form large heavy clods which do not shake free easily and therefore the earth can not be carried off through the elevator chains or screen as expected.

In the type of machine for which the present invention has been developed, the structure 10 includes side boards 11 between which the upper run of the elevator chain or conveyor chain and screen 12 passes, running at its upper end across sprocket wheels, one only of which is shown as indicated at 13, the same being supported upon a transverse shaft 14.

Disposed above the side boards 11 are the rails 15 which are maintained in position by supporting posts 16.

In carrying out the present invention there are provided at the two sides of the conveyor structure, a pair of arms 17 each of which is pivotally supported at one end as indicated at 18. In the present construction the pivotal supports are a pair of bearings or bearing mountings 19 which are secured to the rails 15 and the arms 17 extend toward the adjacent or rear end of the conveyor structure.

The free ends of the arms are adapted to have rotatably connected therewith the ends of a transverse shaft 20. This shaft extends across the width of the conveyor as shown.

Free upward swinging movement of each arm 17 is restricted by a spring element 21 which is interposed between the end of the arm and the overlying rail 15. Each spring element has extending therethrough, a guide pin 22, the lower end of which pin is suitably loosely connected with the adjacent arm 19 to permit the necessary swinging movement of the arm, while the other end of the pin passes upwardly through a guide opening or slot 23 in the overlying rail 15.

Mounted upon the shaft 20 is the clod crusher or masher wheel which is generally designated 24. This wheel comprises a central or body portion 25 with which is integrally formed the hub 26 and the outer rim or felloe 27 upon which are mounted the pair of pneumatic treads or casings 28. While these pneumatic treads are here shown as being in the form of motor vehicle tire casings it is to be understood that the invention is not limited to a construction of this specific character as ordinary annular air cells may be used, being mounted in encircling relation upon the wheel felloe.

The pneumatic treads are encased in a flexible casing or envelope formed of suitable material such as heavy duck fabric or the like, such shell or casing being generally designated 29. As shown this casing 29 completely encircles the pneumatic cells or treads 28 and extends at its edges inwardly partway across the inner side of the wheel felloe where it may be secured in any suitable manner.

The elevator conveyor of a potato harvester is of relatively narrow width and accordingly a wheel having a width substantially equal to the overall width of two truck tire casings will substantially cover the entire surface of the endless conveyor. However, if the invention is to be employed upon machines of larger size it is to be understood that the width of the clod crushing wheel will be increased proportionately so that the elevator chain will be completely covered.

As shown this clod crushing wheel is disposed adjacent to the upper end of the elevator structure so that the potatoes, vines and adhering clods of earth must pass under the wheel before the potatoes reach the point where they are discharged laterally to another conveyor and the vines are carried off from the end of the elevator. Because of the weight of the wheel unit and the fact that its upward movement is resisted by the springs 21 at the two sides of the wheels, it will be seen that a moderately strong pressure will be imposed upon any earth clods which are carried to and beneath the crushing wheel on the conveyor screen. As a result such clods will be broken down into particles of sufficiently small size to pass through the meshes of the screen and thus there will be eliminated the possibility of the clods being carried off to be sacked with the potatoes.

While in the present disclosure the wheeled arms 17 have been illustrated as pivotally attached to the under side of rails mounted above the conveyor structure, it is to be understood that where the invention may be employed in potato harvesters which do not have such rails any other suitable means may be made use of for pivotally securing the arms to the sides of the conveyor. Likewise the spring means may be converted from the type which functions by resisting compression to the type which functions to hold the arms and wheel down by resisting expansion or stretch.

It is also to be understood that while the use of a spring is preferred, as illustrated in Figure 1, the device may also be used effectively without the spring, dependence being placed upon the weight of the wheel to effectively crush the clods.

Also while the device has been illustrated as having the pivoted arms 17 directed toward the lower end of the elevator structure it may also be mounted with the arms extending to the upper end and accordingly this specific mounting is not essential to the proper operation to the device.

I claim:

A crushing roller comprising a hub, a felloe carried by said hub, a pair of rims spacedly encircling said felloe, a pneumatic casing mounted on each of said rims, a band of sheet fabric constituting a tread encircled about said casings and having its opposite side edges trained over the outer sides of said casings and beneath the ends of said felloe, and means for securing the said underlying edge portions of said band against the inner side of the felloe.

CHARLES H. KRENGEL.

REFERENCES CITED

The following references are of record in the file of this patent:

UNITED STATES PATENTS

| Number | Name | Date |
|---|---|---|
| 710,142 | Davidson | Sept. 30, 1902 |
| 796,639 | Hall | Aug. 8, 1905 |
| 922,246 | Belding | May 28, 1909 |
| 1,202,737 | Klitzke et al. | Oct. 24, 1916 |
| 1,767,353 | De Dorlodot | June 24, 1930 |
| 1,814,029 | Free | July 14, 1931 |
| 1,854,261 | Irwin | Apr. 19, 1932 |
| 1,858,783 | Masury | May 17, 1932 |
| 1,958,905 | Anderson | May 15, 1934 |
| 2,005,758 | Shiley | June 25, 1935 |
| 2,062,711 | Hansen | Dec. 1, 1936 |
| 2,265,380 | Maginn | Dec. 9, 1941 |

FOREIGN PATENTS

| Number | Country | Date |
|---|---|---|
| 10,328 | Great Britain | of 1896 |